Aug. 4, 1970  J. W. WARNER, JR  3,522,955
EXTENDABLE HANDLE ASSEMBLY
Filed Jan. 16, 1969  4 Sheets-Sheet 1
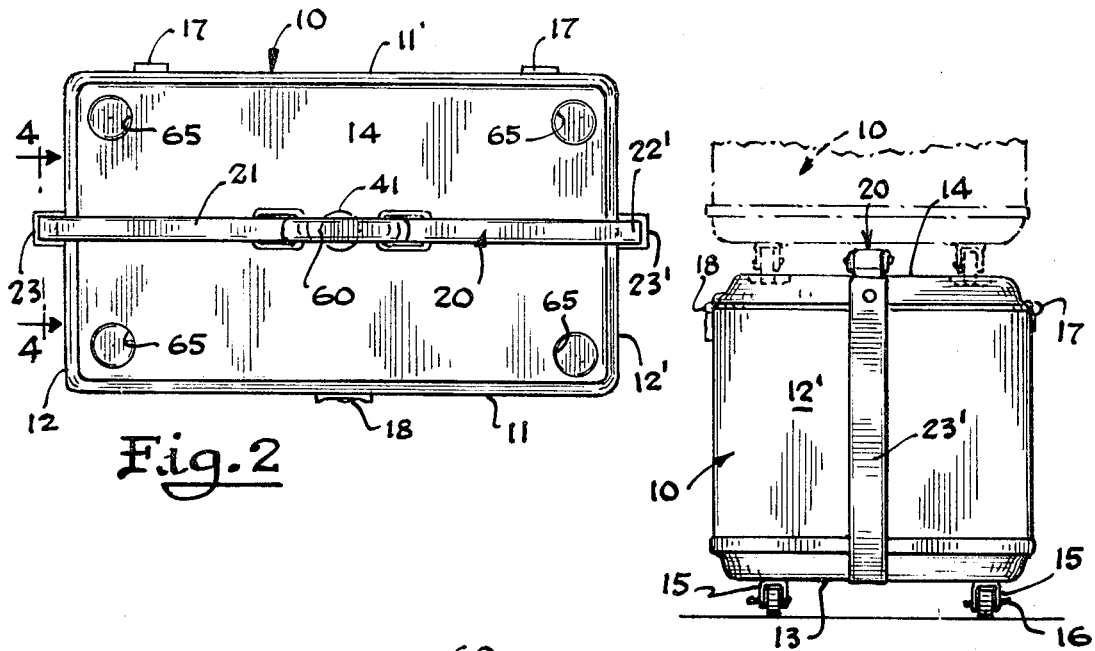
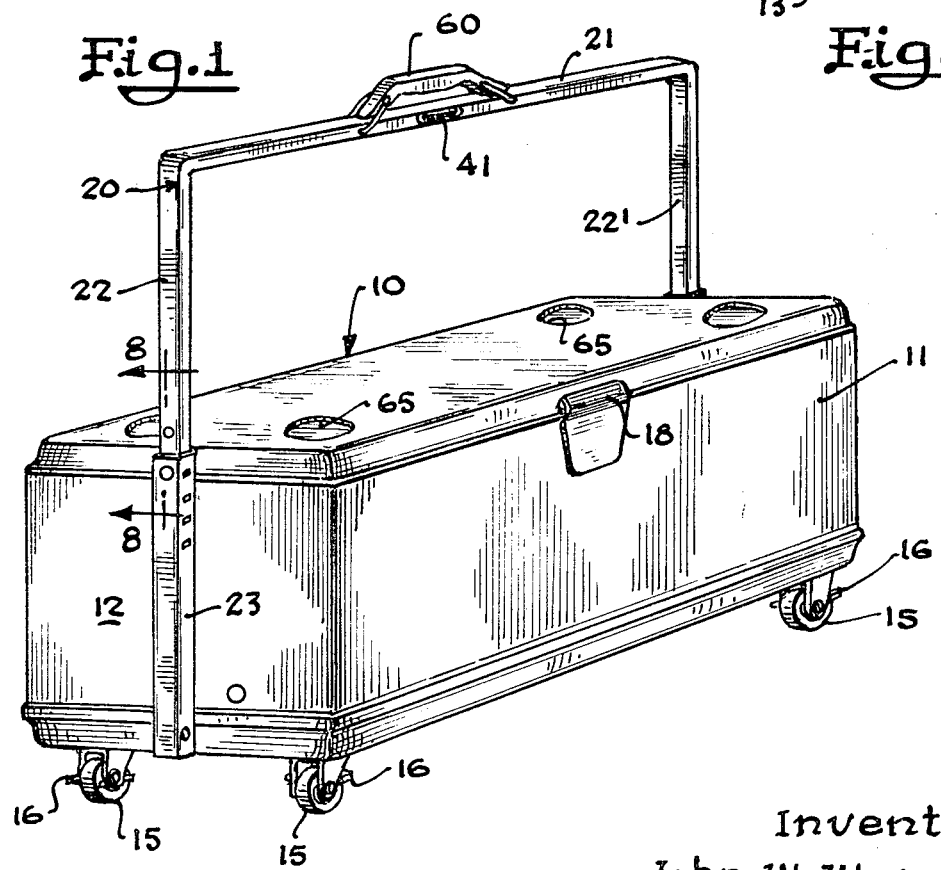
Inventor
John W. Warner, Jr.
By Hibben, Noyes & Bicknell
Attorneys

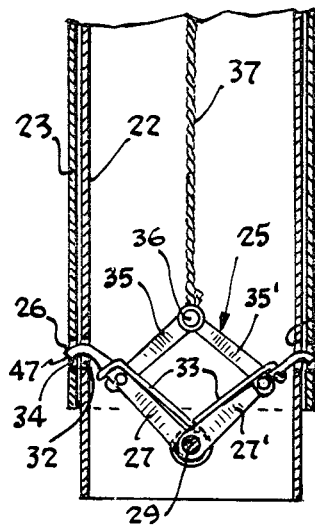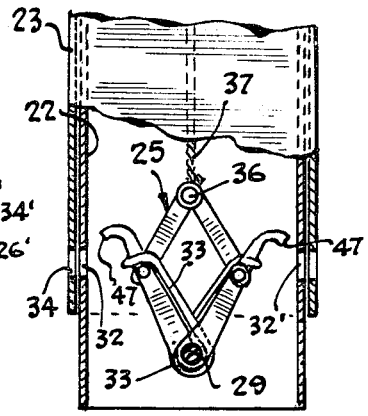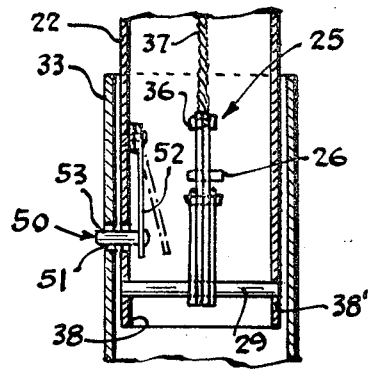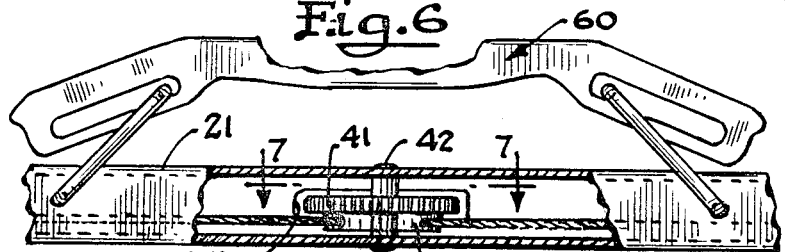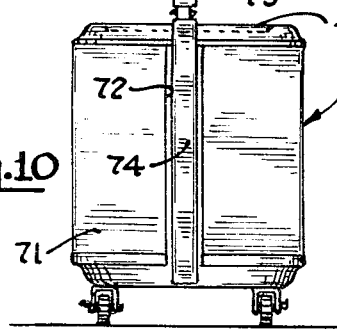

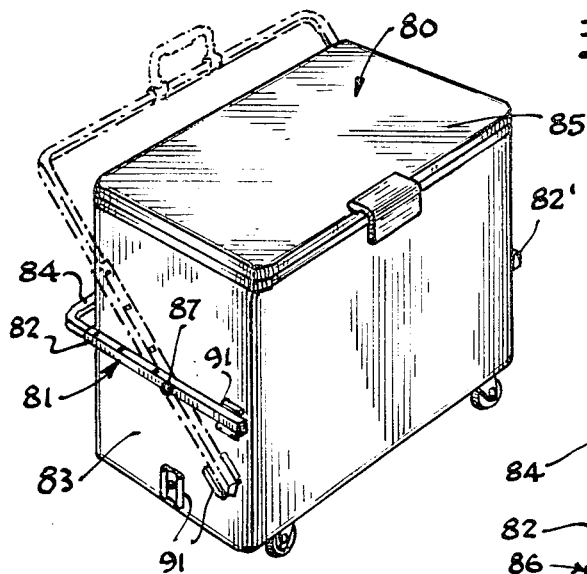
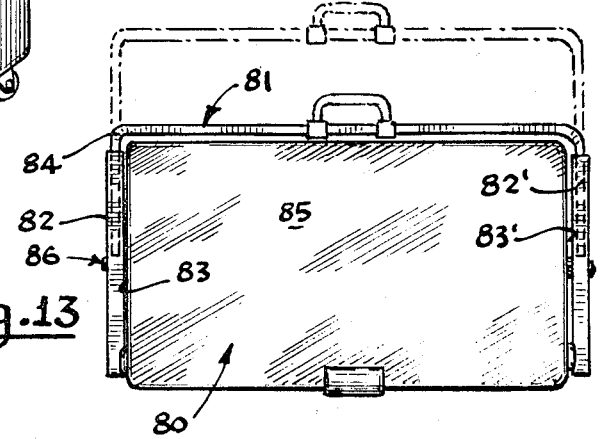
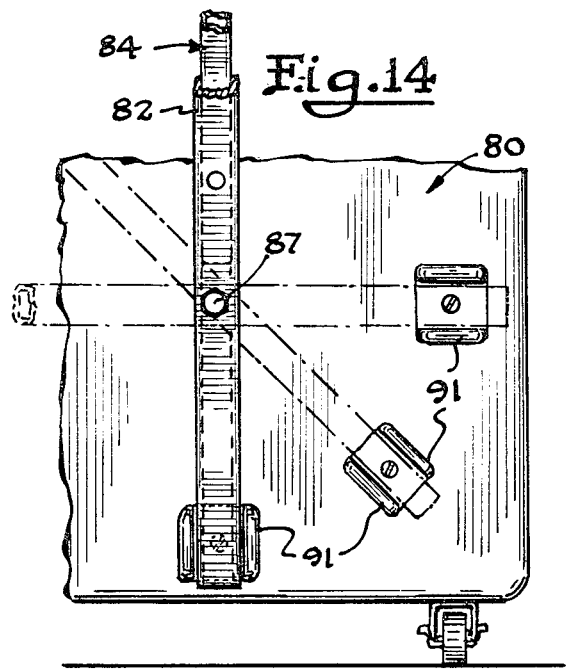
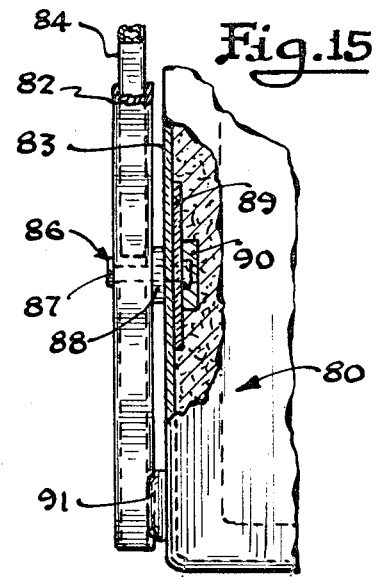
Inventor
John W. Warner, Jr.
By Hibben, Noyes & Bicknell
Attorneys

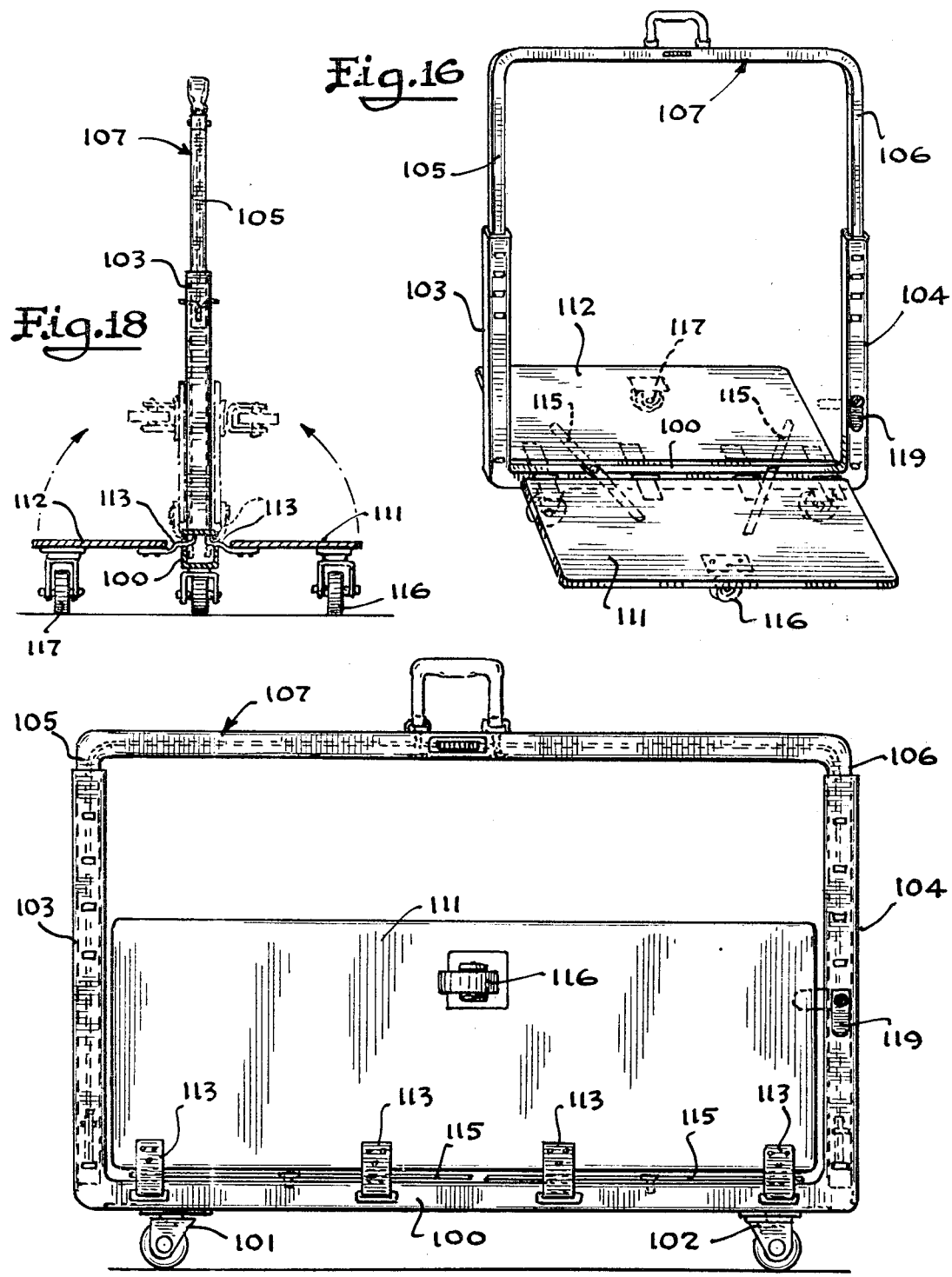

United States Patent Office 3,522,955
Patented Aug. 4, 1970

3,522,955
EXTENDABLE HANDLE ASSEMBLY
John W. Warner, Jr., Waukegan, Ill., assignor to Hideaway Handles, Inc., Waukegan, Ill., a corporation of Illinois
Filed Jan. 16, 1969, Ser. No. 791,623
Int. Cl. B62b 3/02
U.S. Cl. 280—47.37                12 Claims

ABSTRACT OF THE DISCLOSURE

An extendable handle assembly adapted for use with movable container or support structure which has roller means on the lower surface thereof and wherein the handle assembly has a rigid tubular handle bail extending transversely with the bail having depending end sections telescopically adjustably mounted in handle brackets fixedly or pivotally secured to opposite lateral walls of the container or support structure for vertical reciprocable adjustment of the handle bail relative to the container or support structure to facilitate rolling the container along a supporting surface.

---

The present invention relates generally to an extendable handle assembly for a movable container or support structure and more particularly to an adjustable handle means which facilitates moving the container or support structure over a supporting surface.

Containers, baskets or other support structures, which are used for carrying heavy tools, bottles and the like are difficult to move from one location to another even when provided with suitable wheels or the like means for rolling or sliding the container along the supporting surface, as it is often necessary for the individual moving the container to bend over in order to apply the necessary force to effect moving the container along the supporting surface. When containers of the foregoing type are being stored, however, the containers should be capable of being readily stacked one on top of the other in order to conserve space.

It is therefore the object of the present invention to provide an improved handle assembly for a movable container or support structure which makes it possible to more conveniently move the container or structure along a supporting surface.

Another object of the present invention is to provide an improved latch means for an extendable handle structure.

Still another object of the present invention is to provide an improved container which is adapted to be moved along a supporting surface.

It is also an object of the present invention to provide an improved container structure which has a reciprocably and/or pivotally mounted handle structure and which is also adapted for stacking in a minimum space.

Other objects of the present invention will be apparent to those skilled in the art from the following detailed description and claims to follow when read in conjunction with the accompanying drawing wherein:

FIG. 1 is a perspective view of a container embodying the present invention.

FIG. 2 is a top plan view of the container of FIG. 1.

FIG. 3 is an end elevational view of the container of FIG. 1 with the handle portion thereof in a fully retracted position.

FIG. 4 is a fragmentary vertical sectional view partially in elevation taken along the line 4—4 of FIG. 3.

FIG. 5 is a fragmentary vertical sectional view partially in elevation taken along line 4—4 of FIG. 3 in a different position of adjustment.

FIG. 6 is a fragmentary side elevational view partially in vertical section of a portion of the container structure of FIG. 1.

FIG. 7 is a fragmentary top plan view partially in vertical section taken along the line 7—7 of FIG. 6.

FIG. 8 is a fragmentary vertical sectional view partially in elevation taken along the line 8—8 of FIG. 1 showing details of the container structure of FIG. 1.

FIG. 9 is a top plan view of a modified form of a container embodying the present invention.

FIG. 10 is an end elevational view of the container of FIG. 9.

FIG. 11 is a fragmentary side elevational view partially in vertical section showing two containers of FIGS. 9 and 10 stacked one above the other.

FIG. 12 is a perspective view of a further modified form of a container embodying the present invention.

FIG. 13 is a top plan view of the container of FIG. 12.

FIG. 14 is a fragmentary end elevational view showing details of the structure of FIG. 12.

FIG. 15 is a fragmentary vertical sectional view partially in elevation taken along the line 15—15 of FIG. 14.

FIG. 16 is a perspective view of a further modified form of the present invention.

FIG. 17 is a side elevational view of the apparatus of FIG. 16 in fully collapsed form.

FIG. 18 is an end elevational view of the structure of FIG. 16.

In the embodiment of the invention shown in FIGS. 1–8, the container or tote chest 10 which can, for example, be adapted for holding beverage bottles and a cooling medium, is formed of spaced upstanding lateral walls 11, 11' and 12, 12', a bottom wall 13 and a top wall or cover 14 which together form a generally rectangular enclosure. The container 10 can, however, be of any desired cross-sectional shape. The bottom wall 13 is preferably provided with a plurality of spaced roller means extendable below said wall 13, such as swivel wheels 15, preferably provided with wheel brake means 16 of any conventional design which can be conveniently actuated to prevent the wheels rolling. The top wall 14, which can be omitted, if desired, forms a cover for the container 10 and can be secured to a rear lateral wall 11 by a hinge means 17 and is preferably provided with a catch means 18 which is adapted to releasably hold the cover to the front lateral wall of the container 10.

The container 10 has a handle assembly 20 which comprises a handle bail in the form of an inverted-U preferably comprising a rigid unitary tubular member having a rectangular cross-section. The handle bail has a transverse section 21 extending between opposite spaced lateral walls 12, 12' of the container 10 and having depending end sections 22, 22' extending downwardly from the opposite ends of the transverse section 21 along the lateral walls 12, 12' of the container. Each of the lower end portions of the depending end section 22, 22' telescopically engage in spaced tubular handle brackets 23, 23' which are adapted to be disposed vertically on the opposite lateral walls 12, 12', preferably at the midpoint thereof. The depending sections 22, 22' slidably engage the inner surface of the handle brackets 23, 23' for reciprocable vertical movement therein.

The spaced tubular handle brackets 23, 23' preferably have a length such that the depending section 22, 22' of the handle bail can be fully enclosed therein when the transverse section 21 is contiguous with the upper surface of the container 10. The latter relationship enables the lower ends of the depending sections 22, 22' to be releasably locked adjacent the bottom edge of the contiguous handle bracket 23, 23' and also provide space for adjusting the elevation of the transverse section 21 of the handle bail to a number of different positions above the upper wall or cover 14, ase will be described hereinafter.

A latch means 25 is provided in the lower end of each section 22, 22′ for releasably connecting the sections 22, 22′ and the bracket 23, 23′. The latch means 25 includes latch pins 26, 26′ having a flat upper surface and forming the outer end portions of latch arms 27, 27′ which are pivotally joined at their inner ends by a support pin 29 extending through the oppositely disposed wall sections of the depending sections 22, 22′ to form a toggle joint. The latch arms 27, 27′ are urged outwardly through oppositely disposed openings 32, 32′ in the wall of sections 22, 22′ by a spring means 33 mounted on the pin 29. The latch pins 26, 26′ are adapted to engage in oppositely disposed openings comprising latch pin receiving means 34, 34′ formed in the lateral walls of the brackets 23, 23′ adjacent the lower end thereof and thereby hold the sections 22, 22′ and the handle bracket 23, 23′ in releasable locking engagement which prevents relative longitudinal movement therebetween. Each of the latch arms 27, 27′ has an actuating lever arm 35, 35′, respectively, pivotally connected thereto adjacent the outer end of the latch arm 27, 27′. The inner ends of the lever arms 35, 35′ are pivotally mounted on a connector pin 36 at about the longitudinal axis of the depending sections 22, 22′. A latch release cord 37 or similar flexible line has one end fastened to the pin 36 and extends upwardly for connection with a suitable latch control means. It will be evident that when an upward tension is applied to the latch cord 37, the latch arms 27, 27′ are drawn inwardly to effect withdrawal and disengagement of the latch pins 26, 26′ from the aligned openings 34, 34′ in the handle brackets 23, 23′, thereby allowing sections 22, 22′ to be moved axially relative to the handle brackets 23, 23′.

A latch actuating means 40 comprises a latch pin retraction disc 41 fixedly secured to a vertically disposed axle pin 42 pivotally supported in the transverse section 21 of the handle bail at a point about midway between the opposite lateral walls 12, 12′ of the container. The latch retraction disc 411 has a diameter greater than the width of the transverse section 21 and extends through oppositely disposed slots 44, 44′ formed in the opposite lateral surfaces of the transverse section 21. Also fixedly secured to the axle pin 42 is an actuating disc 45 which has a diameter less than the internal diameter of the tubular section 21 so that when the actuating disc 45 is rotated with the axle pin 42, the latch retraction disc 41 is also rotated. The actuating disc 45 has a passage 46 extending therethrough for retaining a section of the latch cord 37. It will be evident that when the latch cord 37 extends through the passage 46 with the opposite ends thereof secured to the connector pins 36 of latch means 25 suspended within the opposite ends of section 22, 22′, rotating the latch pin retraction disc 41 in either direction will apply an upward tension on the latch cord 37 and draw the latch pins 26, 26′ inwardly to permit moving the sections 22, 22′ relative to the handle brackets 23, 23′.

The latch pins 26, 26′ are preferably provided on the outer end thereof with downwardly and inwardly bevel 47. The lower surface of the bevel 47 is disposed in the openings 34, 34′ with the bevel adapted to contact the inner edge of the openings 34, 34′ when a downward pressure is applied on the transverse section 21 and depending sections 22, 22′ whereby the latch pins 26, 26′ will be cammed inwardly, permitting the handle bail to be lowered without requiring moving the latch actuating disc 41.

An automatic safety stop means 50 is also preferably provided for the handle bail and handle brackets to prevent unintentional withdrawal and separation of the handle bail from the handle brackets 23, 23′ while any suitable means can be used, the stop means 50 shown consists of stop openings 51, 51′ extending through the wall of each handle bracket 23, 23′ adjacent the top thereof and providing a leaf spring 52 mounted within each depending section 22, 22′ adjacent the lower end thereof with an outwardly extending projection 53 on the lower end of the spring 52 which extends outwardly through an opening 54 in a portion of the wall 38 of each section 22, 22′. The projection 53 is adapted to enter the stop opening 51 under the urging of leaf spring 52 when the projection 53 is moved to a position opposite the stop opening 51 just before the depending sections 22, 22′ are completely withdrawn from the handle brackets 23, 23′.

In order to facilitate moving the container 10 a hand grip 60 is preferably pivotally secured to the upper surface of the transverse section 21 adjacent the midpoint thereof. The hand grip 60 can be of any desired or conventional form but should preferably not interfere with the stacking of the containers. The top wall or cover 14 of the container 10 is also preferably provided with concave recesses 65 which are spaced so as to receive therein the swivel wheels 15 of a like container 10 when two such containers are stacked one on top of the other, as when the containers are being stored.

It will be evident from the foregoing description and FIGS. 1–8 of the drawing that the latch means 25 is adapted to selectably hold the handle bail in any one of several positions elevated above the upper wall of the container to accommodate the height of any individual and to lock the handle bail in a fully retracted position with a minimum effort.

FIGS. 9 and 10 illustrate a modified form of a container or tote chest in which the container 70 has spaced lateral walls 71, 71′ formed with a recess 72, 72′ extending vertically substantially the height thereof to accommodate therein the handle brackets 74, 74′ of a handle assembly 73 preferably having the structure shown in FIGS. 1–8 of the drawing. The outer surface of each of the depending sections 74, 74′ of the handle assembly 73 preferably lies in substantially the same place as the outer surfaces of the spaced lateral walls 71, 71′. If desired, the upper wall or cover 75 can also be provided with a similar longitudinally extending recess to receive the longitudinally extending portion 76 of the handle assembly 73.

The upper wall or cover 75 of the container 70 is also preferably provided with transversely extending depressions 77, 77′ adjacent each end which have front, rear and side bevelled surfaces so that the swivel wheels of a like container 70 when stacked on top of a container 70 are seated in the depression 77, 77′ and are preferably engaged by the front, rear and side bevelled surfaces to prevent the container rolling forward, sidewardly or rearwardly. A central depressed area 78 is also provided in the upper wall 75 to form a space below the longitudinally extending section 76 of the handle assembly which will prevent injury to the fingers of an individual when the handle assembly is moved to its fully retracted position contiguous with the upper wall 75 of the container 70.

A further modified form of the present invention is shown in FIGS. 12–15 of the drawing, wherein the handle assembly 81 of the chest 80 comprises handle bracket members 82, 82′ pivotally mounted on oppositely disposed lateral walls 83, 83′ of the chest 80 to permit positioning the handle bail 84 in a generally horizontally extending position rather than vertically as when clear access to the interior of the chest 80 through the upper cover means 85 is desired. The handle bracket members 82, 82′ are pivotally attached, preferably at a point spaced from the lower end thereof by suitable mounting means 86 of the opposite lateral walls 83, 83′. The mounting means 86 comprises in the form illustrated a bolt 87 extending through the bracket member 82 and through a resilient outer washer 88 and an inside plate 89 which engage the wall 83 of the chest with a bolt 90 holding the assembly in position on the supporting wall of the chest. The outer end sections of each of the bracket members 82, 82' are releasably held by one of several spaced resilient means 91 on the lateral walls 83, 83' of the chest 80 along an arcuate path. One of the resilient means 91 is mounted to hold the bracket members 82, 82' in a vertical position, another resilient means 91 is mounted to hold the bracket members 82, 82' in a substantially horizontal position, and, if desired, one or more to the resilient means 91 can be mounted intermediate the first two resilient means 91 for holding the handle bracket members 82, 82' in an intermediate position of pivotal adjustment. It should be understood that the handle bail 84 which is reciprocably mounted in the handle bracket members 82, 82' preferably has the same general structure as in the handle assembly described in connection with FIGS. 1–8 of the drawing. It will be evident, however, that the depending end portions of the handle bails 84 cannot extend below the bolt 87 which extends through the bracket members 82, 82'.

In the further modified form of the invention shown in FIGS. 16, 17 and 18, there is provided a longitudinally extending tubular support section 100 having a generally rectangular cross section with spaced roller means 101, 102 mounted on the underside thereof. The opposite ends of the tubular support section 100 extending upwardly at right angle to the support section 100 forming integral handle bracket sections 103, 104 which are adapted to telescopically receive therein the depending end sections 105, 106 of a handle bail 107. The longitudinally extending handle bracket sections 103, 104 and the handle bail 107, including the latch mechanism, preferably have the same general construction as the corresponding parts shown in FIGS. 1–8 of the drawing. If desired, however, the vertical adjustment feature of the handle bail 107 can be dispensed with and a fixed handle bail can be secured to the handle bracket sections 103, 104. A hand engaging member 108 of any desired type can be secured to the handle bail at the midpoint thereof, if desired.

The longitudinally extending support section 100 has secured thereto between the ends thereof a transversely extending base section 110 which is preferably formed of two support panels 111, 112 which provides a load supporting platform means. The panels 111, 112 are pivotally mounted on the support section 100 by suitable fastener means 113 which permit moving the panels 111, 112 from a load supporting laterally extending position in a plane perpendicular to the plane of the bracket sections 103, 104, to a vertical extending position in the general plane of the bracket sections 103, 104. One or more arm members 115 are also pivotally mounted on the support section 100 and are adapted to be moved from a longitudinally extending position parallel to the longitudinal axis of the support section 100 to a transversely extending position for engaging the upper surface of the panels 111, 112 and maintaining the panels 111, 112 in a load supporting position. Roller means 116, 117 are mounted on the lower surface of each of the panels 111, 112, respectively, preferably at about the midpoint thereof adjacent the outer lateral edge.

When desired, the support panels 111, 112 are movable into the vertically extending position in the plane of the bracket sections 103, 104 and are held at their elevated or folded position by a resilient clip member 119 attached to the bracket sections 103, 104. The support panels 111, 112 can be formed of imperforate sheets, such as sheet metal, or can be formed of a perforated or expanded metal sheet or wire grating construction.

While the container used to illustrate the present invention has been provided with swivel wheels, it will be understood that any other type wheel or bearing can be used which will support the container and offer low resistance to moving the container over a supporting surface, such as roller bearings, ball bearings, or slides for use on special surfaces.

It should also be understood that other latch means and other latch control means can be used for releasably interconnecting the handle bail and handle bail brackets in place of the means described in the present specification without departing from the scope of the present invention as defined in the appended claims.

I claim:
1. An extendable handle assembly adapted to be mounted on a support structure comprising; a rigid handle bail having a transverse section with depending end sections extending from the opposite ends of said transverse section, handle brackets adapted to be secured to said support structure, said handle brackets slidably interengaging with said depending end section for axial movement thereof relative to said brackets, latch means operatively interconnecting said bail and said brackets and releasably restraining said bail against axial movement relative to said brackets, said latch means being mounted in said depending end sections of said handle bail and comprising a retractable latch pin means mounted in each of said depending end sections of said bail adapted to form a releasable engagement with said handle brackets to effect releasably restraining said bail against axial movement relative to said brackets, and a latch pin retraction means mounted in said transverse section for disengaging said latch pin means from said brackets; whereby said bail can be adjustably moved relative to said brackets.

2. An extendable handle assembly as in claim 1, wherein said latch pin retracting means comprises a latch pin retraction disc affixed to an axle rotatably supported in said transverse section of said handle bail, said retraction disc having a recess formed therein for retaining therein a flexible line interconnecting said latch pin means, and said axle having fixedly mounted thereon an actuating disc extending through openings in the lateral surface of said bail for effecting rotation of said discs; whereby a tension is applied to said flexible line when said discs are rotated for drawing said latch pin means out of engagement with said handle brackets.

3. An extendable handle assembly as in claim 1, wherein said handle brackets are provided with at least two axially spaced latch pin receiving means in which the outer end of said latch pin means is releasably retained therein, whereby said handle bail can be releasably held in at least two positions of vertical adjustment.

4. An extendable handle assembly as in claim 3, wherein each said latch pin means is provided with a latch pin having a downwardly and inwardly bevelled end surface which is adapted to contact the inner edge of said latch pin receiving means when downwardly pressure is applied to said handle bail, whereby said latch pin is cammed inwardly forcing said latch pin out of engagement with said latch pin receiving means.

5. An extendable handle assembly as in claim 1, wherein a safety stop means is provided on said handle bail adjacent the ends thereof for automatically forming a locking engagement with said handle brackets before said handle bail is completely withdrawn from said handle brackets.

6. An extendable handle assembly as in claim 1, wherein said handle brackets are adapted to be pivotally mounted on spaced lateral surfaces of a container.

7. An extendable handle assembly as in claim 1, wherein said handle brackets are adapted to be secured to a support structure having a roller means attached to a lower surface portion thereof to facilitate movement of said structure over a supporting surface.

8. An extendable handle assembly as in claim 1, wherein said handle brackets are adapted to be secured to a support structure which comprises a container having a roller means attached to a lower surface portion thereof to facilitate movement of said structure over a supporting surface.

9. An extendable handle assembly as in claim 1, wherein said support structure comprises a container having spaced lateral walls and a lower wall which comprises said lower support section, and said container is provided with an upper wall having recesses formed in the upper surface thereof to receive therein said support means of a said container when two said containers are stacked one on top of the other.

10. An extendable handle assembly as in claim 9, wherein each said oppositely disposed lateral wall surfaces is provided with a vertically disposed recess in which said handle brackets are disposed with the outer surface of said handle brackets and said wall surfaces lying in substantially the same vertical plane.

11. An extendable handle assembly as in claim 1, wherein said support structure comprises a longitudinally extending support member having said handle bracket connected to the opposite ends thereof, said support member having attached thereto a platform means with roller means mounted on a lower surface portion thereof, and said platform means adapted to be moved from a load supporting position lying generally in a transverse plane perpendicular to the longitudinal plane of the said handle brackets into a position lying substantially in the longitudinal plane of said handle brackets.

12. An extendable handle assembly as in claim 11, wherein said support member has roller means attached at the opposite ends thereof and wherein said platform means is comprised of oppositely disposed load supporting sections pivotally attached to said support member, and each said load supporting sections adapted to being pivotally moved from a plan perpendicular to the longitudinal plane of said handle brackets into the longitudinal plane of the handle brackets.

References Cited

UNITED STATES PATENTS

| 2,925,283 | 2/1960 | Stigler | 190—18.2 |
| 3,084,949 | 4/1963 | Forster | 280—47.37 |
| 3,275,336 | 9/1966 | Warner | 16—115 |

FOREIGN PATENTS

| 231,311 | 4/1925 | Great Britain. |

BENJAMIN HERSH, Primary Examiner

R. R. SONG, Assistant Examiner

U.S. Cl. X.R.

16—115; 190—180